United States Patent
Cudak et al.

(10) Patent No.: US 9,942,473 B2
(45) Date of Patent: Apr. 10, 2018

(54) APPARATUSES AND METHODS FOR CAPTURE OF EXPECTED DATA IN VISUAL MEDIA

(71) Applicant: LENOVO Enterprise Solutions (Singapore) PTE. LTD., New Tech Park (SG)

(72) Inventors: Gary D. Cudak, Wake Forest, NC (US); Shareef F. Alshinnawi, Apex, NC (US); Brian E. Finley, Allen, TX (US); David R. Kinnie, Rochester, MI (US); Marc K. Fisher, Austin, TX (US); Jamie Johnston, Austin, TX (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/185,009

(22) Filed: Jun. 16, 2016

(65) Prior Publication Data
US 2017/0366744 A1 Dec. 21, 2017

(51) Int. Cl.
- *H04N 5/232* (2006.01)
- *G06K 9/18* (2006.01)
- *G06K 9/32* (2006.01)

(52) U.S. Cl.
CPC ......... *H04N 5/23222* (2013.01); *G06K 9/18* (2013.01); *G06K 9/3241* (2013.01); *H04N 5/23293* (2013.01)

(58) Field of Classification Search
None
See application file for complete search history.

(56) References Cited

U.S. PATENT DOCUMENTS

| 5,828,773 A | 10/1998 | Setlak et al. |
| 6,606,117 B1 * | 8/2003 | Windle ............ H04N 1/00183 348/222.1 |

(Continued)

OTHER PUBLICATIONS

Cuncur, "How to Capture Receipts with Your Mobile Phone", Cuncur.com,https://webcache.googleusercontent.com/search?q=cache:mupKp3iJqVoJ:https://www.concur.com/blog/en-us/how-to-capture-receipts-with-a-mobile-phone+&cd=1&hl=en&ct=clnk&gl=us, Last visited Apr. 11, 2016.

(Continued)

*Primary Examiner* — Timothy J Henn
(74) *Attorney, Agent, or Firm* — Kunzler, PC.

(57) ABSTRACT

An apparatus for providing guidance for image capture includes a recognition module that recognizes data objects in data available to an image capture device. At least a portion of the data includes characters. The apparatus includes a context module that determines a context associated with a first image available from the image capture device. The context includes one or more expected data objects, where the first image includes at least a portion of the recognized data objects. The apparatus includes a data module that compares the expected data objects for the determined context, with the recognized data objects from the first image to identify missing expected data objects not found in the first image. The apparatus includes a guidance module that, in response to identified missing data, provides guidance for capturing a second image expected to include the missing expected data objects.

20 Claims, 8 Drawing Sheets

(56) References Cited

U.S. PATENT DOCUMENTS

| | | | |
|---|---|---|---|
| 2011/0216209 A1* | 9/2011 | Fredlund | H04N 1/00488 348/211.99 |
| 2011/0280450 A1* | 11/2011 | Nepomniachtchi | G06K 9/32 382/112 |
| 2013/0230246 A1* | 9/2013 | Nuggehalli | G06Q 10/10 382/176 |
| 2014/0064618 A1* | 3/2014 | Janssen, Jr. | G06K 9/00469 382/182 |
| 2014/0072201 A1* | 3/2014 | Tilt | H04N 5/23293 382/140 |
| 2015/0138399 A1* | 5/2015 | Ma | G06K 9/00624 348/239 |
| 2015/0172603 A1* | 6/2015 | Gorodetski | G06Q 30/04 348/61 |
| 2016/0125613 A1* | 5/2016 | Shustorovich | G06K 9/00463 382/140 |
| 2016/0309085 A1* | 10/2016 | Ilic | G06T 3/4038 |
| 2017/0134647 A1* | 5/2017 | Tobin | H04N 5/23222 |
| 2017/0140432 A1* | 5/2017 | Lin | G06Q 30/0261 |

OTHER PUBLICATIONS

Tallie, "Tallie 10.4 Release Notes: User Interface Enhancements Make Sorting Expense Reports Simple", Tallie Blog, https://blog.tallie.com/page/8/, Last visited Apr. 29, 2016.

* cited by examiner

APPARATUSES AND METHODS FOR CAPTURE OF EXPECTED DATA IN VISUAL MEDIA

BACKGROUND

Description of the Related Art

Many different kinds of image capture devices capture digital images. Data, including images, captured by image capture devices may include data objects that may be recognized as symbols, words, and objects. Dedicated applications may be configured to recognize certain types of data available to image capture devices.

BRIEF SUMMARY

An apparatus for providing guidance for image capture device to capture an image that includes missing expected data objects for a determined context is disclosed. A method and computer program product also perform the functions of the apparatus. The apparatus includes a recognition module that recognizes data objects in data available to an image capture device. At least a portion of the data includes characters. The apparatus includes a context module that determines a context associated with a first image available from the image capture device. The context includes one or more expected data objects, where the first image includes at least a portion of the recognized data objects. The apparatus includes a data module that compares the expected data objects for the determined context, with the recognized data objects from the first image to identify missing expected data objects not found in the first image. The apparatus includes a guidance module that, in response to identified missing data, provides guidance for capturing a second image expected to include the missing expected data objects.

In one embodiment, the determined context is one of a plurality of contexts, where each of the plurality of contexts includes one or more expected data objects. In some embodiments, the determined context includes the context of the plurality of contexts with the greatest number of expected data objects corresponding to the recognized data objects. In some embodiments, one or more of the plurality of contexts includes data previously captured by the image capture device, where the image capture device is used by a user, data previously captured by another image capture device linked to the user of the image capture device, and/or contexts associated with one or more of accounts and vendors associated with the user.

In one embodiment, the apparatus includes a storage module that temporarily stores the data available to the image capture device ("temporarily stored data") for processing by the recognition module. In another embodiment, the first image comprises a portion of the temporarily stored data. In some embodiments, the data module also determines an expected location of missing expected data objects based on relative locations of recognized data objects within the temporarily stored data and/or relative locations of expected data objects to each other for the determined context.

In some embodiments, the relative location of recognized data objects to each other is determined taking into account changes in image capture parameters occurring as the data is temporarily stored. In some embodiments, the temporarily stored data includes relative locations of each of the data objects within the temporarily stored data. The relative locations of the data objects are with respect to each other. In some embodiments, the guidance module provides guidance that includes panning, zooming, lighting, and/or focusing. The guidance is calculated to facilitate capturing the second image, based on an expected location of the missing expected data objects. In some embodiments, the guidance module provides the guidance via the viewer of the image capture device. In some embodiments, the recognition module recognizes data objects in the data available to the image capture device using optical character recognition. In some embodiments, the data available to the image capture device includes image data, speech data, textual data, geographical data, and/or user data.

A method is disclosed that includes recognizing data objects in data available to an image capture device and determining a context associated with a first image available from the image capture device. The context includes one or more expected data objects and the first image includes at least a portion of the recognized data objects. The method includes comparing the expected data objects for the determined context, with the recognized data objects from the first image to identify missing expected data objects not found in the first image and providing, in response to identified missing data, guidance for capturing a second image expected to include the missing expected data objects.

In one embodiment, the determined context is one of a plurality of contexts. Each of the plurality of contexts includes one or more expected data objects. The one or more of the plurality of contexts include data previously captured by the image capture device, where the image capture device is used by a user, data previously captured by another image capture device linked to the user of the image capture device, and/or contexts associated with one or more of accounts and vendors associated with the user. In some embodiments, the determined context includes a context of the plurality of contexts with a greatest number of expected data objects corresponding to the recognized data objects.

In one embodiment, the method includes determining an expected location of the missing expected data objects by temporarily storing the data available to the image capture device ("temporarily stored data"), where relative locations of the recognized data objects within the temporarily stored data are used to determine the expected location of the missing expected data objects, and where the first image includes a portion of the temporarily stored data. In another embodiment, the method includes determining an expected location of the missing expected data objects by determining relative locations of expected data objects to each other from the determined context. In some embodiments, determining an expected location of the missing expected data objects takes into account changes in image capture parameters occurring as data is temporarily stored.

A system is disclosed that includes an image capture device with a processor and a computer readable storage device in the image capture device. The computer readable storage device includes a recognition module, a context module, a data module, and a guidance module. The recognition module recognizes data objects in data available to the image capture device. At least a portion of the data includes characters. The context module determines a context associated with a first image available from the image capture device. The context includes one or more expected data objects, where the first image includes at least a portion of the recognized data objects. The data module compares the expected data objects for the determined context, with the recognized data objects from the first image to identify missing expected data objects not found in the first image and a guidance module that provide, in response to identified missing data, guidance for capturing a second image expected to include the missing expected data objects.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
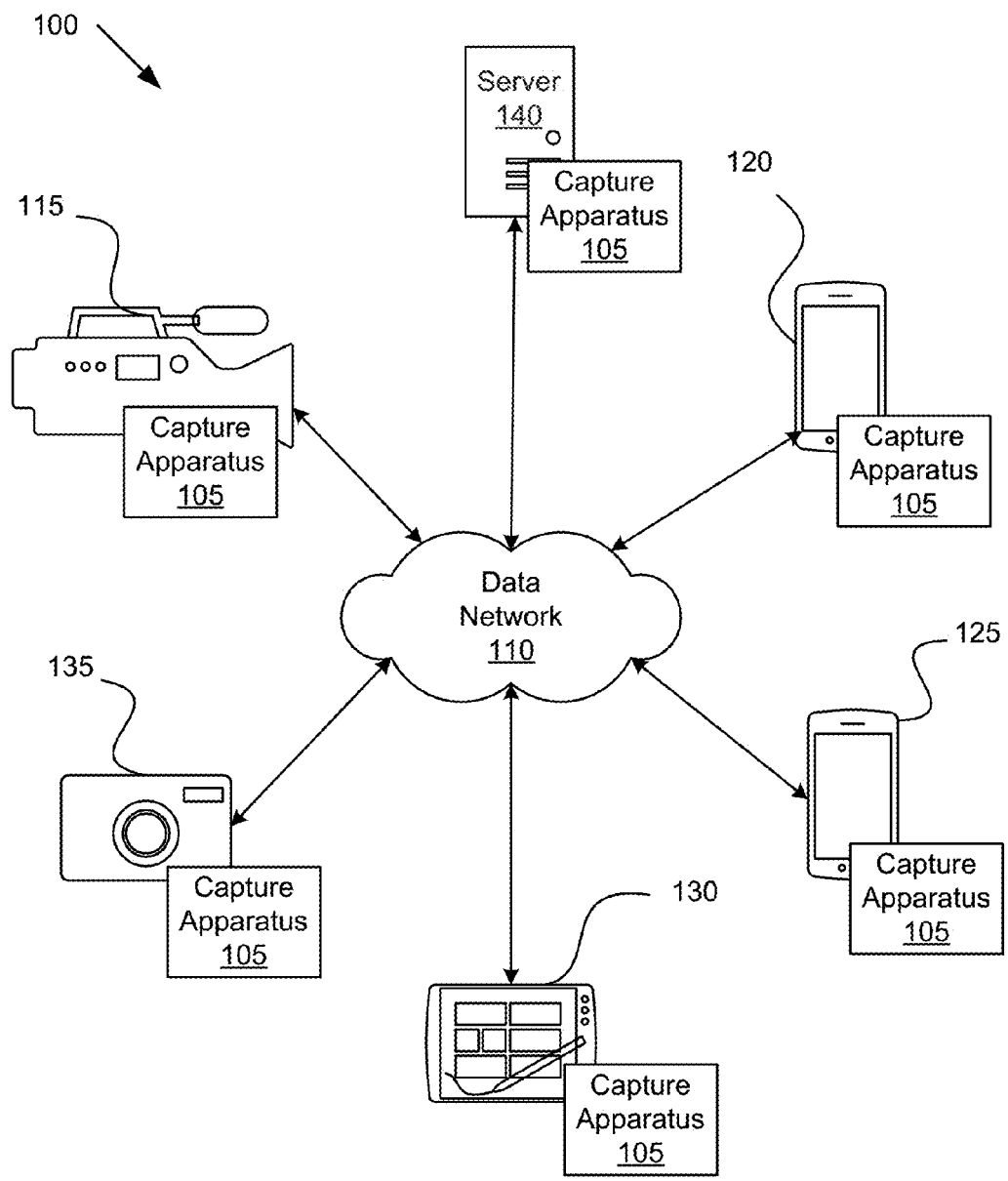
FIG. 1 is a schematic block diagram illustrating one embodiment of a system for capturing an image.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom Very Large Scale Integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The description of elements in each Figure may refer to elements of proceeding Figures. Like numbers refer to like elements in all Figures, including alternate embodiments of like elements.

FIG. 1 is a schematic block diagram illustrating one embodiment of a system 100 for capturing an image. The system 100 includes embodiments of a capture apparatus 105, a data network 110, a video camera 115, smartphones 120, 125, a portable computing device 130, a camera 135, and a server 140, which are described below.

The capture apparatus 105 recognizes data objects available to an image capture device and determines a context associated with a first image from the image capture device where the first image includes some of the data objects. Each context is associated with a number of expected data objects, such as certain data fields, shapes, etc. and the expected locations of the data objects. The capture apparatus 105 compares data objects for the determined context to recognized data objects from the first image to determine if some expected data objects are missing. If there are missing data objects, the capture apparatus 105 provides guidance for capturing a second image that is expected to include the missing expected data objects. The capture apparatus 105 is described in more detail with respect to the apparatuses 200, 300 of FIGS. 2 and 3.

In some embodiments, system 100 includes smartphones 120, 125 that are image capture devices. As used herein, smartphone 120, 125 refers to a mobile phone that includes camera components for capturing and/or processing images. Some smartphones 120, 125 combine the functions of a personal digital assistant and a mobile telephone. Smartphone 120, 125 are capable of wireless communications for both telephone functions and computing. Current smartphones 120, 125, such as BlackBerry®, Android®, and iPhone® models, are capable of executing task-specific modules that access particular image capture hardware and/or software, Some embodiments of system 100 include a portable computing devices 130 that are image capture devices. Some current portable computing devices include tablet devices such as iPad®, Android® or Windows® model tablets. Some portable computing devices 130, such as tablets and notebooks, include front facing and rear facing cameras for capturing images. Portable computing devices 130 may also include notebooks, laptops, Ultrabooks® that have camera components for capturing images. Typical portable computing devices 130 can transmit and receive data via data network 110.

Other embodiments of system 100 include camera 135 and video camera 115. Camera 135 and video camera 115 may be portable and/or handheld cameras. Camera 135 and video camera 115 may also be web cams, traffic cameras, security cameras, and the like. Cameras 135 and video camera 115 may be analog or digital cameras that capture still or moving images and/or audio. Many image capture devices have a built-in display that can display images along with textual or graphical overlays related to the images.

Many image capture devices, such as smartphones 120, 125, portable computing devices 130, and cameras 135, 115, also include audio inputs such as microphone inputs. Microphone inputs may be built-in or may be a wireless microphone such as in a Bluetooth® headset. Microphone inputs may also be through a headphone jack. Audio files sent through messaging systems or over cellular telephone networks may also be a source of audio input. Many image capture devices also include various outputs. For example, many cameras 135, 115, smartphones 120, 125 and portable computing devices 130 also include one or more audio outputs such as a speaker, a headphone jack, or a wireless Bluetooth® connection.

In some embodiments, image capture devices, e.g. video camera 115, camera 135, portable computing device 130, smartphone 125, and smartphone 120, accommodate removable digital storage media, such as Secure Digital™ cards, also known as SD™ cards or microSD™ cards, that enable data from media of any type to be physically transferred from one device to another by removing the removable digital media device from one image capture device and inserting it into another device. In some embodiments, image capture devices, e.g. cameras 115, 135, smartphones 120, 125, and portable computing device 130 send and/or receive data, including image data, via data network 110.

In some embodiments, system 100 includes a data network 110 that enables image capture devices (e.g. smartphone 120, 125, portable computing device 130, cameras 135, 115 to communicate with other devices including other image capture devices. Data network 110 may local area network ("LAN") or a Wide Area Network ("WAN"). Data network 110 may utilize wired network technology such as Ethernet®. Data network 110 may also be wireless network such as a cellular radio network such as 3G, 4G, LTE or such as a Wi-Fi network. In some embodiments, data network 110 includes a wireless connection to other devices.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In some embodiments, data network 110 enables image capture devices (e.g. 115, 120, 125, 130, 135) to communicate with a server 140. As user herein, the server 140 refers to a program and/or computing device that serves one of more client programs/devices via data network 110. The server 140 may be a desktop computer, a workstation, a laptop computer, a rack-mounted computer, a mainframe computer, or the like. In some embodiments, server 140 is a computing device that sends and receives data, including image data over data network 110. In some embodiments, server 140 is a server type such as an application server, catalog server, communications server, computing server, database server, fax server, file server, game server, mail server, media server, print server, sound server, proxy server, web server. In some embodiments, the server 140 executes program instructions related to image capture and processing including image data storage, image processing, image database access/maintenance, and the like.

In some embodiments, the server 140 includes one or more capture apparatuses 105. In other embodiments, server 140 includes selected modules included in the capture apparatus 105. However, it will be understood, that capture apparatus 105 and any of its included modules need not be distributed to be operative.

As shown, in one embodiment, system 100 includes a capture apparatus 105 associated with each image capture device, e.g. smartphones 120, 125, a portable computing device 130, a camera 135, a video camera 115, a server 140, etc. However, it will be understood that in some embodiments, the system 100 includes some image capture devices that include a capture apparatus 105 and other capture devices that do not include a capture apparatus 105.

Figure 2:
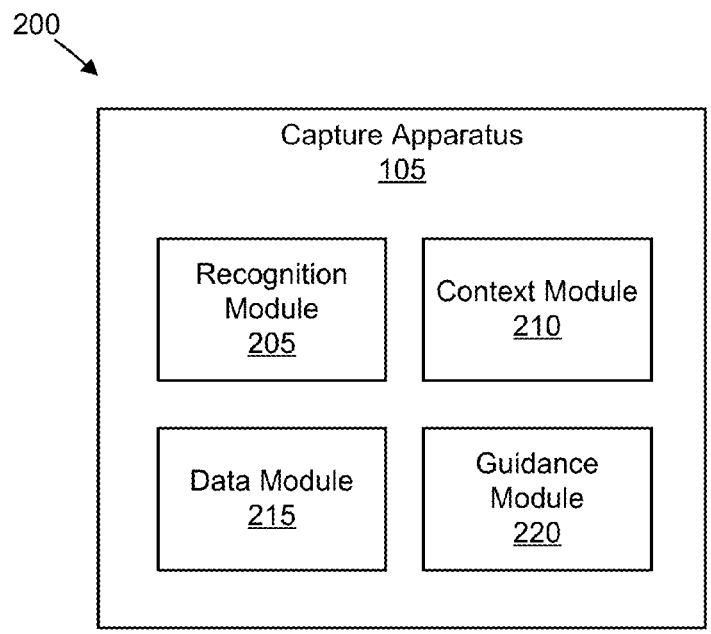
FIG. 2 is a schematic block diagram illustrating an embodiment of an apparatus for capturing an image.

FIG. 2 is a schematic block diagram illustrating an embodiment of an apparatus 200 for capturing an image. The apparatus 200 includes one embodiment of the capture apparatus 105 that includes a recognition module 205, a context module 210, a data module 215, and a guidance module 220, which are described below. While the modules 205, 210, 215, and 220 are depicted in the capture apparatus 105, in some embodiments, some or all of the modules 205, 210, 215, and 220 may be located elsewhere and may be implemented in various ways, such as hardware circuits, programmable devices, executable code, etc. and may be implemented using a combination of executable code combined with hardware circuits, programmable devices, etc.

The apparatus 200, in one embodiment, includes a recognition module 205 that recognizes data objects available to an image capture device (e.g. 115, 120, 125, 130, 135). At least a portion of the data comprises characters. In some embodiments, the capture apparatus 105 receives data in one or more formats, such as image data, textual data, or audio data. The recognition module 205 recognizes data objects, such as characters, words, phrases, or objects within the received data. As used herein, the term data object refers to recognizable groups of characters, numbers, letters, or image data that represent a word, a phrase, a physical object, and so forth. A stream or file of image data, whether static or dynamic, may include recognizable data objects within the data.

In some embodiments, the recognition module 205 recognizes data objects in the data available to the image capture device using optical character recognition ("OCR"). Speech-to-text recognition is another example that recognizing data objects such as words or phrases from streams or files of speech data. In some embodiments, geographical data is available to image capture devices. For example, the image capture device may include a global positioning system device that receives geographical data. Geographical data may also be obtainable by comparing the strength of wireless signals from particular access points or cellular towers. Geographical data may also be obtainable by direct entry or via the data network 110. User data such as a user name, user identifier, user preferences, user account, user history, and so forth may also be available in image capture devices. Thus, in some embodiments, the data available to image capture devices (e.g. 115, 120, 125, 130, 135) includes one or more of image data, speech data. Textual data, geographical data, and/or user data.

In some embodiments, the recognition module 205 recognizes data objects within image data captured by a camera 115, 135 or a camera within a smartphone 120, 125, a portable computing device 130, etc., as textual input. For example, in an image of a receipt, a street address of a merchant may be a recognizable data object. A street address is a recognizable data object that includes other recognizable data objects such as a name of a street, a street number, a city, a state, a zip code, and so forth.

In other embodiments, data objects recognizable by the recognition module 205 include some data objects that include characters recognizable by OCR and other data objects recognizable by object recognition. An image of a house may include the shape or outline of the house as a recognizable data object. The image can include other recognizable data objects such as a house number, a porch lamp, a door, a roof, exterior walls, and so forth. In some embodiments, the recognition module 205 recognizes words or phrases from audio data, video data, text messages, emails, and other type of data available. The words, phrases, and/or other data objects recognized relate to an image and to an application associated with the image.

Many image capture devices (e.g. 115, 120, 125, 130, 135) also have other types of data available to them. For example, in some embodiments, smartphones 120, 125 or a portable computing device 130 may receive textual data from a short messaging services or email services via data network 110 from another electronic device, such as a smartphone (e.g. 125). In some embodiments, the image capture devices receive textual input through a keyboard interface or through a keyboard displayed on a touchscreen. In some embodiments, the recognition module 205 recognizes data objects in image data directly captured by the image capture device with which the capture apparatus 105 is associated. Typical image capture devices (e.g. 115, 120, 125, 130, 135) include a viewer which provides a view of a frame of image data that is able to be captured by the image capture device.

In other embodiments, the recognition module 205 recognizes data object in image data captured by a different image capture device. For example, an image captured by a smartphone 120 is sent via the data network 110 to another smartphone 125, where a recognition module 205 associated with the other smartphone 125 recognizes data objects within the image.

In some embodiments, the recognition module 205 performs its functions primarily on the image capture device (e.g. 115, 120, 125, 130, 135). In other embodiments, some function of the recognition module 205 are performed on the server 140. For example, in some embodiments, the recognition module 205 recognizes letters and numbers and a license plate shape. In one embodiment, the recognition module 205 communicates these letters and number to the server 140. A recognition module 205 within the server 140 may then recognize the combination of letter and numbers as a data object, (e.g. a license plate number). In one embodiment, a similar process is carried out by a first recognition module 205 communicating via data network 110 with other image captures devices. In the embodiment, the other image capture devices include a second recognition module 205 that recognizes data objects within the data communicated via the data network 110.

In one embodiment, the recognition module 205 recognizes data objects in the data available to an image capture device prior to the image capture device capturing an image. For example, the recognition module 205 may recognize data objects while the image capture device is being move, panning, zooming etc. before the user takes action to capture an image. The recognition module 205 may store the recognized data objects for use by the capture apparatus 105 apart from an image captured by the user of the image capture device. In another embodiment, the recognition module 205 recognizes data objects in one or more images captured by a user prior to the user capturing another image. For example, the user may capture several images at a particular location, of one or more objects, etc. where data objects in the prior captured images may be used by the capture apparatus 105, as described below.

The apparatus 200, in one embodiment, includes a context module 210 that determines a context associated with a first image available from the image capture device. In one embodiment, the first image is an image available in a viewer of the image capture device, e.g. the display screen or a portion of the display screen of the smartphones 120, 125, portable computing device 130, camera 135, and/or video camera 115. In another embodiment, the first image is an image captured by the user, by snapping a picture, pressing a button, touching the viewer, etc. In another embodiment, the first image is an image in the view of the image capture device after the user has paused moving or zooming the image capture device, such as is typical just prior to the user capturing the image available in the viewer. The first image, in some embodiments, includes at least a portion of the recognized data objects that were recognized by the recognition module 205.

Each context is associated with a number of expected data objects, such as certain data fields, shapes, etc. and the expected locations of the data objects. Although a first image available from the image capture device may not include all expected data objects for a determined context, the determined context includes at least a portion of the recognized data objects recognized by recognition module 205. For example, the context determined by context module 210 for a particular image includes one or more data objects recognized by recognition module 205 from the first image data.

A context may include certain data objects in particular locations. Some of the data objects may be fixed where other data objects may be variable. For example, a context for a receipt may include a data object of a particular vendor in a particular location on a receipt, such as at the top of the receipt, at the bottom of the receipt, etc. In the receipt context, the name of the vendor, the vendor address, a vendor's symbol, etc. may not change while other data objects, such as a date may be in a fixed location, but will typically change. Other data objects for the context, such as purchased products, prices, etc. may change but may be in a particular format. In general, a context includes certain data objects expected to be in certain locations and/or data objects with common content.

A context for a particular image enables the image to be recognized as expected to include certain expected data objects. For example, as illustrated in FIG. 4B, in a receipt context for an expense report application, an image of a receipt 420 may be expected to include expected data objects such as a date, an amount spent, and/or a number of guests or persons associated with the expense.

In some embodiments, context module 210 determines a context from a number of contexts that are particular to specific image capture applications, or to a specific vendor, account, or the like. Examples of specific image capture applications include expense report applications that capture data objects from images for transfer to expense reports. Other applications may include contact applications that capture data objects from business cards to facilitate transferring contact information to a contact database. Applications for identifying certain types of data objects, such as price information, address information, or practically any type of data objects that may be recognized in an image may provide one of many contexts available to the capture apparatus 105.

In other embodiments, the context module 210 determines a context from a number of contexts that relate to particular type of expected data within an image to be captured by the image capture device. In one embodiment, such as depicted in FIG. 4C, a parking monitoring context includes license plate numbers 450, logos 453, and license plate shapes 455 as expected data objects to be recognized within an image of front or rear portion of a vehicle. Merchants may provide contexts that are geared to a particular location. For example, a retail merchant may provide input that is associated with particular brands of goods such as clothing, cars, books, and so forth, sold by that particular merchant. Thus, the number of contexts available to the capture apparatus 105 may be few in some embodiments and many in other embodiments.

One way of determining a context for a particular image uses the recognition module 205 to recognize data objects from various data sources to identify data objects that are expected to be found within a first image. For example, the user of a smartphone 120, 125 may receive a text message, or a voice message, that says "please send the receipt for your current expense report." In some embodiments, recognition module 205 recognizes the words "send the receipt," and "your current expense report," and context module 210 determines that the context relates to an expense report associated with a particular user (as indicated by the word "your"), for a particular date range (as indicated by the word "current").

In some embodiments, the recognition module 205 further recognizes a data object within the image of the receipt as the name of a particular restaurant and the context module 210 determines that the context relates to an expense report for expenses incurred at the named restaurant. Examples illustrating some of the functions of the context module 210 are described in more detail with respect to FIGS. 4A-4D and FIG. 5A-5C.

In some embodiments, the context module 210 determines a context from a number of contexts, where the contexts include data previously captured by the image capture device that is being used by a user, data previously captured by another image capture device linked to the user of the image capture device, and/or contexts associated with accounts and/or vendors associated with the user. In one embodiment, a user frequently purchases goods from a first vendor, e.g. an office supply vendor. In one embodiment, the context module 210 determines, based on data previously captured by the user using the input capture device, e.g. a first smartphone 120, that the context is a receipt context. The context module 210, in another embodiment, further determines based, on data previously captured by another computing device e.g. a second smartphone 125 linked to the user, that the context is a receipt context for the particular office supply vendor. The context module 210, in another embodiment, determines, based on contexts associated with the office supply vendor, the expected location for the total amount of the expense relative to the vendor name. Thus, the determined context may include data from three different but related sources.

The apparatus 200, in one embodiment, includes a data module 215 that compares expected data objects for the determined context, for example determined by the context module 210, with recognized data objects from the first image, for example data objects which have been recognized by the recognition module 205. By comparing the expected data objects for the context with the recognized data objects, the data module 215 identifies missing expected data objects not found in the first image. To illustrate, the recognition module 205 may recognize some data objects in a first image even if the first image is misaligned, cut off, too zoomed in, or too zoomed out, etc.

However, some expected data objects for the context may not be found in the first image. For example, in FIG. 5A, a first image of a receipt 420 is shown. The recognition module 205 may recognize a restaurant name 430 as a data object. The context module 210 may then determine that the context associated with the image is a receipt context for the named restaurant. The data module 215 may then compare the expected data objects for the receipt context, with the recognized data objects in the first image of receipt 420. One of the expected data objects, a number of guests served 440 is not found in the first image. Thus data module 215 identifies number of guests served 440 as a missing expected data object. Examples illustrating the functions of data module 215 are described in more detail with respect to FIGS. 4A-4D and FIG. 5A-5C.

In FIG. 2, the apparatus 200, in one embodiment, includes a guidance module 220. In response to identified missing data, the guidance module 220 provides guidance for capturing a second image expected to include the missing expected data objects. In some embodiments, the guidance module 220 provides guidance including panning, zooming, lighting, and/or focusing guidance. The guidance is typically calculated to facilitate capturing the second image bases on an expected location of missing expected data objects. In one embodiment, the guidance module 220 provides guidance based on relative location information included in the context determined for the first image.

In one embodiment, a context for a first image is determined by the context module 210 and missing expected data objects are identified by the data module 215. The determined context may also include information about the relative location of expected data objects within an image associated with the context. For example, in one embodiment, a real estate listing context may include an expected location of a house number relative to a door for a particular housing development, or a particular style of house. In another embodiment, a receipt context may include expected locations of expected data objects such as a total expense, an amount of tax paid, or a signature line. The guidance module 220 may utilize the information about the relative location of expected data objects for the context to calculate and provide panning, zooming, light, and/or focusing guidance to facilitate capturing a second image that includes the missing expected data objects.

In some embodiments, the guidance module 220 provides guidance using various modes. For example, the guidance module 220 may provide guidance via the viewer of the image capture device. Further examples of guidance that may be provided by the guidance module 220 are described below in the description of FIGS. 5A-5C.

Figure 3:
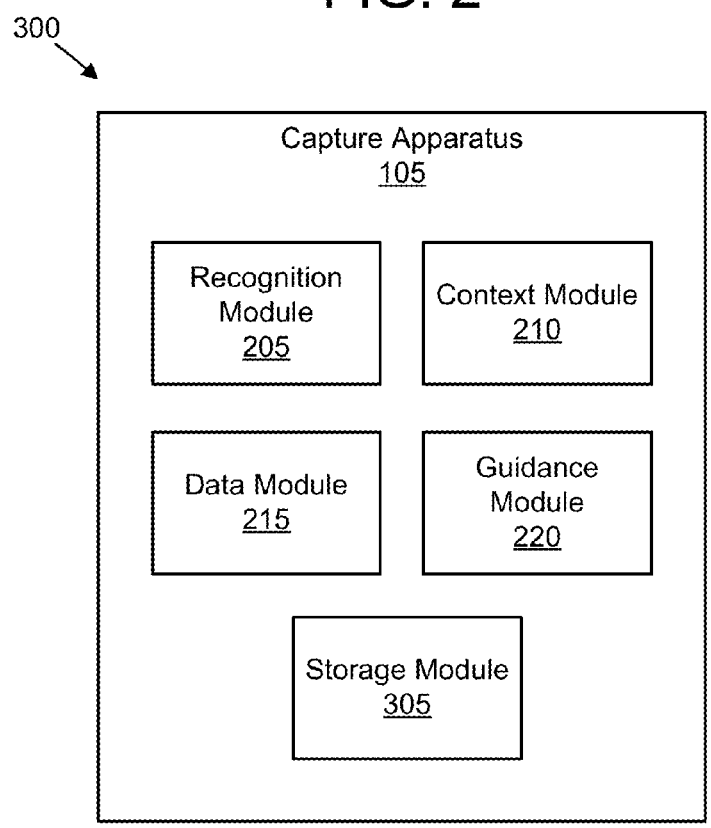
FIG. 3 is a schematic block diagram illustrating another embodiment of an apparatus for capturing an image.

FIG. 3 is a schematic block diagram illustrating another embodiment of an apparatus for capturing an image. The apparatus 300 includes another embodiment of the capture apparatus 105 that includes a recognition module 205, a context module 210, a data module 215, and a guidance module 220, which are substantially similar to the apparatus 200 as described above with respect to FIG. 2. The apparatus 300 further includes a storage module 305 that temporarily stores data available to the image capture device ("temporarily stored data") for processing by the recognition module 205. In some embodiments, image data and/or other types of date are available to the recognition module 205 prior to the image capture device displaying the image data and prior to capturing a field of image data to be saved as digital photo image file. For example, in some embodiments an image capture device may have data image available while a user is panning or zooming to center an image within a viewer before the user touches or presses a "shutter release" button or a digital touch screen equivalent of a shutter release button which causes the image capture device to store a digital photo of the image in the viewer at the moment the button is touched.

In some embodiments, the storage module 305 temporarily stores data before and during the manipulation. In some embodiments, the storage module 305 temporarily stores at least a portion of the data to local memory within the image capture device (e.g. 115, 120, 125, 130, 135), associated with the capture apparatus 105. In some embodiments, the storage module 305 temporarily stores data to a remote location, such as the server 140.

Thus, the first image does not necessarily need be stored as a file on storage media within the image capture device. The first image could be, for example, data that is being temporarily stored in the image capture device as a user is preparing to capture an image. It could also be a digital image or a stream of imaged transmitted via the data network 110 to be temporarily stored on the server 140. Similarly, one of more of the contexts available to the capture apparatus 105 and associated with an image capture device may include data previously captured by the image capture device. For example, a user may use a smartphone 120 to capture one or more images that may relate to one or more of the contexts available to the same user when capturing an image at a later time.

FIG. 3 illustrates an embodiment 300 of the capture apparatus 105 that includes a storage module 305 that temporarily stores the data available to the image capture device ("temporarily stored data") for processing by the recognition module 205. In some embodiments, the recognition module 205 operates on the temporarily stored data to provide data to the context module 210 that determines a context based on recognition of expected data objects for a context within the image data. In some embodiments, the storage module 305 stores information about the relative locations of recognized data objects within the temporarily stored data. For example, in one embodiment, many first images of a receipt are stored as a user manipulates the image capture device to capture an image. The recognition module 205 recognizes data objects such as words, phrases, and/or logos and the like, within any of the first images and the storage module 305 temporarily stores information about the relative locations of the recognized data objects. The data module 215, in the embodiment, determines an expected location of missing expected data objects based on the recognized data objects within the temporarily stored data and possibly on relative locations of the recognized data objects.

In one embodiment, the recognition module 205 recognizes the image as a receipt and recognizes the name of a restaurant as one of the data objects. In the first image, the name of the restaurant may no longer be in the image. In the embodiment, the data module 215 identifies one or more missing expected data objects, such as the name of the restaurant. The data module 215 may then determine an expected location of the missing expected data objects based on the relative location of recognized data objects within the temporarily stored data.

In one embodiment, a storage module 305 associated with a smartphone (e.g. 120) temporarily stores a number of images as a user manipulates the image capture device of the smartphone 120 to center and focus on capturing an image of a receipt. In one embodiment, the data module 215 determines an expected location of missing expected data objects based on the temporarily stored information stored by the storage module 305 about the relative locations of recognized data objects within the temporarily stored data. In some embodiments, the storage module 305 stores information about image capture parameters. In the embodiment, the data module 215 takes into account changes in image capture parameters that occur during the storing of image data and utilizes them to make adjustments to the relative locations of recognized data objects within the temporarily stored data.

In other embodiments, the data module 215 determines an expected location of missing expected data objects based on the relative location of expected data objects to each other for the determined context. For example, in one embodiment, a receipt context for a particular restaurant includes relative locations to each other of the restaurant name and the date of the expense. In some embodiments, the data module 215 determines an expected location of missing expected data objects based on both the relative locations of recognized data objects within the temporarily stored data and relative locations of expected data objects to each other for the determined context.

In some embodiments, temporarily stored data includes both image data and data other than image data. For example, words or objects in images are captured and temporarily stored as a user adjusts, centers, zooms, or pans the image capture device. Textual data, voice data, or data from other devices received via the data network 110 is also temporarily stored and used by the data module to determine relative locations of data objects within the temporarily stored data. FIGS. 4A-4D and FIGS. 5A-5C provide examples illustrating in more detail the functions of embodiments of the capture apparatus 105 and modules 205, 210, 215, 220, 305. It will be noted that FIGS. 4A-4D and FIGS. 5A-5C depict a smartphone 120, 125 as representative of an image capture device. However, the use of a smartphone 120, 125 as a representative image capture device is merely exemplary and any image capture device such as cameras 135, 115, portable computing device 130, or any image capture device that is capable of capturing and processing image data can be used in any of the exemplary embodiments.

Figure 4A:
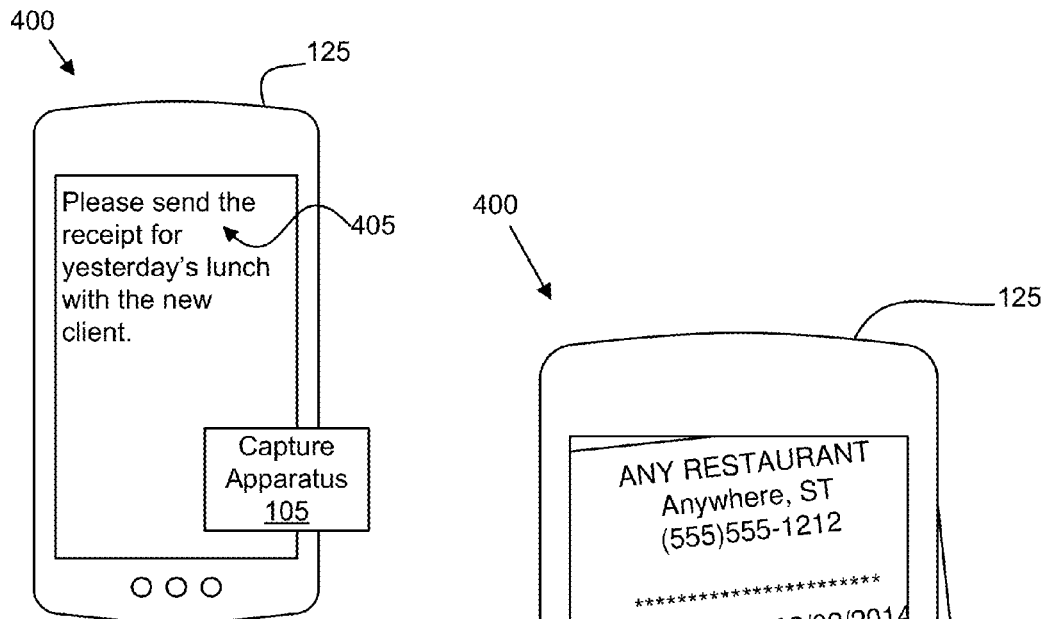
FIG. 4A depicts an embodiment of an apparatus receiving input about expected data for a context.
Figure 4B:
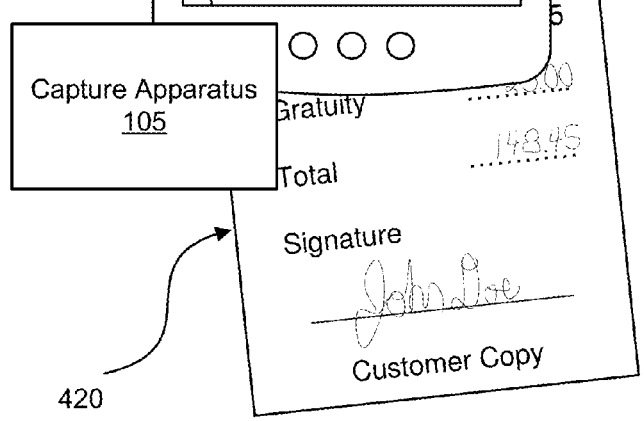
FIG. 4B depicts an embodiment of an apparatus monitoring and storing image data.
Figure 4C:
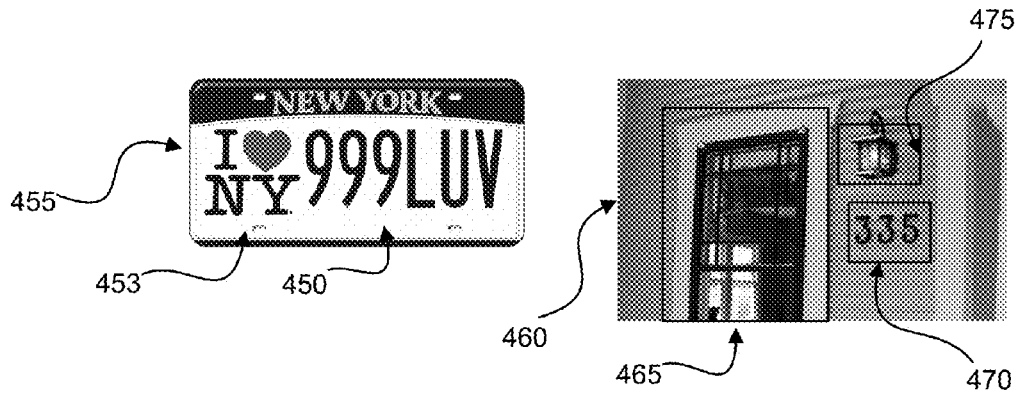
FIG. 4C depicts examples of contexts and data objects available to an image capture device.

FIG. 4A depicts an embodiment 400 of a capture apparatus 105 associated with an image capture device (e.g. a smartphone 125) receiving input about expected data for a context. A data source 405 is depicted as a text message requesting that a user of the smartphone 125 "please send the receipt for yesterday's lunch with the new client." The data source 405 may include keywords such as "please send" which can be recognized by the recognition module 205 as data objects associated for example with a context where a user of the image capture device is being asked to send an image or data from an image.

In the embodiment, the recognition module 205 recognizes the word "receipt" as indicating that context associated with the image is expected to include data objects associated with a receipt. The recognition module 205 may also recognize the word "yesterday" as associated with a date and determines that the image is expected to include receipt data objects from an expense paid yesterday. The words "lunch with the new client" may be recognized by the recognition module 205 to indicate that the expense involves lunch with two or more people, one of whom is a new client. Although the words recognized in the data source 405 are portrayed as a text message, in some embodiments, the recognition module 205 and the other the modules 210, 215, 220, 305 within the capture apparatus 105 may process text messages, voice messages, and other types of data.

FIG. 4B depicts an embodiment 400 of the capture apparatus 105 associated with an image capture device (e.g. a smartphone 125), in which the capture apparatus 105 monitors, displays, and in some embodiments temporarily stores image data. The viewer of the smartphone 125 is displaying an image of a receipt 420 in response to the data source 405 depicted in FIG. 4A. A user manipulates the smartphone 125 to capture an image that includes expected data objects for an application that fills out an expense report.

Some data objects found on the receipt 420 are not found within the image of the receipt 420 as displayed on the viewer of the smartphone 125. The context module 210 determines a context associated with the image of the receipt 420. In some embodiments, based on input from the data source 405 (e.g. a text or voice message received prior to capturing a particular image that requested that the receipt 420 be sent) as depicted in FIG. 4A, (e.g. a message received prior to capturing a particular image), the context module 210 determines that the context for a digital image of the receipt 420 is an expense report context.

FIG. 4C depicts examples of subject matter to be processed by the capture apparatus 105 of an image capture device. The recognition module 205 recognizes data objects within data sources for an image capture device and the context module 210 determines the context for an image to be captured by the image capture device. In some embodiments, the recognition module 205 uses optical character recognition to recognize data objects such as letters or numbers. The recognition module 205 further recognizes that individual characters and/or numbers form a portion of a data object such as a word, phrase, and/or identifier, or a value for a data object.

In some embodiments, the recognition module 205 also recognizes shapes of objects within a first image as data objects. For example, in a first image of a license plate 455 and a first image of the front of a house 460, the recognition module 205 may recognize groups of numbers. Since both a parking monitoring context and a real estate listing context include identifying numbers as expected data objects e.g. the license plate number 450 (which is '999' in the first image of the license plate 455) and the house number 470 (which is '355' in the first image of the front of a house 460), the context module 210 compares recognized objects from the first images with expected data objects for multiple contexts and determines the context.

In one embodiment, the context module 210 recognizes other data objects in the first image of the license plate 455, such as a logo 453 and the shape of license plate 455. The context module 210 may determine that the first image of the license plate 455 relates to a parking monitoring context because the parking monitoring context is the context out of the available contexts that has the greater number of expected data objects corresponding to the recognized data objects.

By a similar process, the context module 210 may determine that the image of a front of a house 460 relates to a real estate listing context. Although a number is an expected data object for both a parking monitoring context and a real estate listing context, a porch light 475, and an outline of a front door 465, along with a recognized number such as a house number 470, provide the context module 210 with a greater number of recognized objects in the image that match expected data objects for a real estate listing context than for a parking monitoring context. Similarly, a shape of a license plate 455 or a state license plate logo 453 as recognized by the recognition module 205, match a greater number of expected data objects for a parking monitoring context, than for a real estate listing context.

In an example embodiment involving a real estate listing context, the house number 470 has an expected location below the porch light 475. In one real estate listing context, an expected data object within image of the front of a house 460 is an outline of house that includes the sides and the roof (not shown). The data module 215 compares the expected data objects for the determined real estate context to identify missing expected data objects not found in the first image. In an embodiment, depicted in FIG. 4C, the image of a front of a house 460 includes expected data objects (the porch light 475, the house number 470, and the outline of front door 465), but an expected outline of the house showing the sides and roof in the image is not found or recognized within the image and is thus identified as a missing expected object.

Figure 4D:
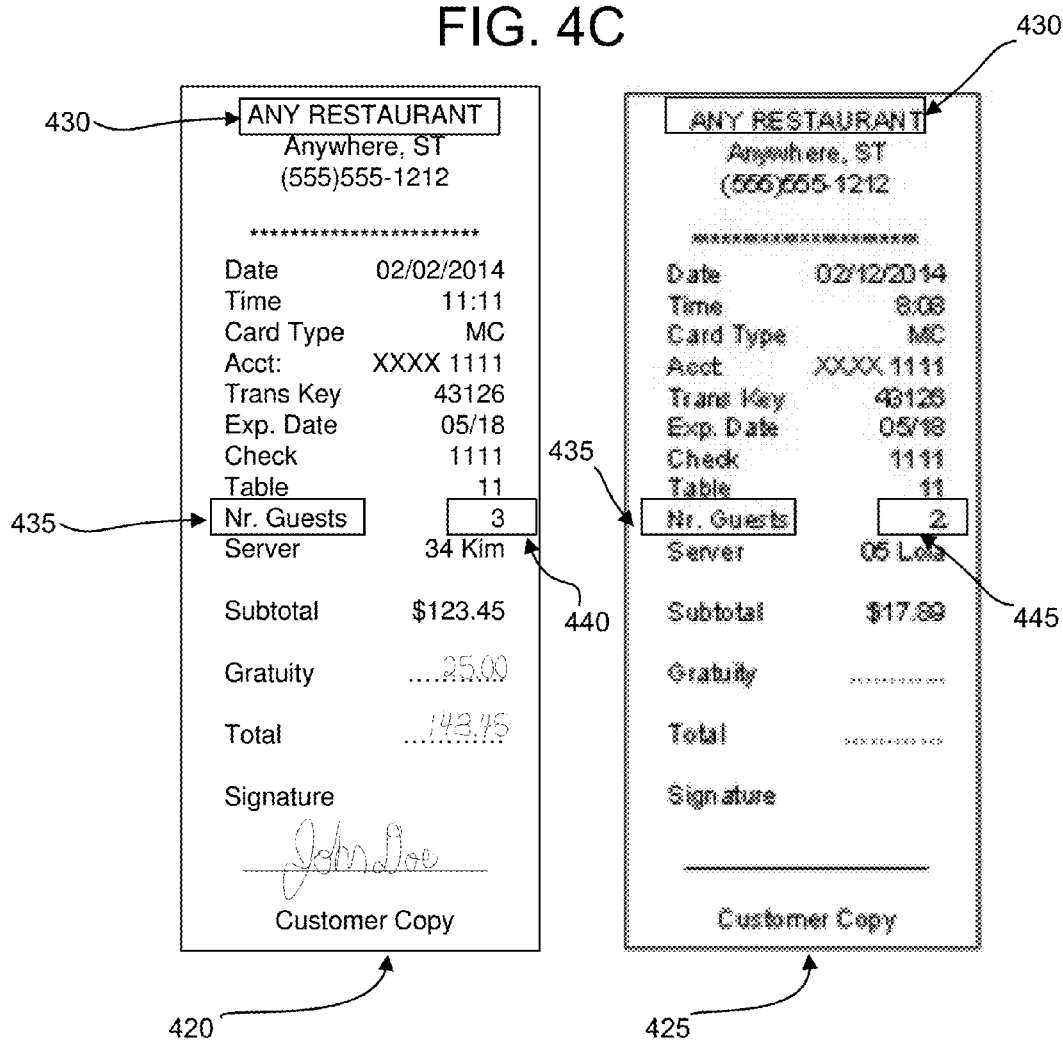
FIG. 4D depicts examples of receipt contexts and data objects available to an image capture device.

In FIG. 4D, images of a first receipt 420 and a second receipt 425 both include the name of a restaurant as an expected data object 430. The date associated with the second receipt 425 is Feb. 12, 2014, and the date associated with the first receipt 420 is Feb. 2, 2014. Because the restaurant name expected data object 430, in the image of the second receipt 425 matches the restaurant name expected data object 430, in the image of the first receipt 420, the context module 210 identifies the image of the second receipt 425 as being associated with a receipt context and additionally as being associated with a context for receipts from the particular restaurant named in the restaurant name expected data object 430.

Thus, information regarding the relative location of the restaurant name expected data object 430 and the number of guests expected data object 440 in the image of the first receipt 420 are useful to provide an expected relative location of the "number of guests" data object 445 with regard to the restaurant name expected data object 430. In other words, in the image of the first receipt 420, the data module 215 identifies from the context module 210 that for receipts where the restaurant name is "Any Restaurant" as shown in the restaurant name expected data object 430, the "number of guests" (the number guests expected data object 445) has an expected location that is the same distance below the name of the restaurant in the image of the second receipt 425 as the distance of the number of guests expected data object 440, below restaurant name expected data object 430 in the image of the first receipt 420.

Thus, the capture apparatus 105, through the operation of the recognition module 205, recognizes data objects such as the restaurant name and the number of guests within the image. The context module 210 determines that the context associated with image of the first receipt 420 is a receipt context or an expense report image context based on finding and recognizing data objects within the image data available to the image capture device. The data module 215 compares expected data for a receipt/expense report context and in particular the context of a receipt from a restaurant named "Any Restaurant" and identifies expected data that may be missing.

For example, if the receipt context for "Any Restaurant" includes as an expected object, a handwritten signature, the fact that a handwritten signature may be recognized as a data object in the image of the first receipt 420 but not in the image of the second receipt 425 at an expected data object location would indicate that there is no signature recognizable as a data object in the image of the second receipt 425, as it apparently is the case here. Alternatively, that fact that a handwritten signature cannot be found with any image captured or stored temporarily may merely indicate that the image capture device has not yet captured data in which a handwritten signature can be found. The guidance module 220 may then provide guidance for capturing an image that includes the relative location of an expected handwritten signature for the second receipt 425 based on the location of the handwritten signature in the image of the first receipt 420 relative to other recognized or expected objects in the image.

Figures 5A, 5B:
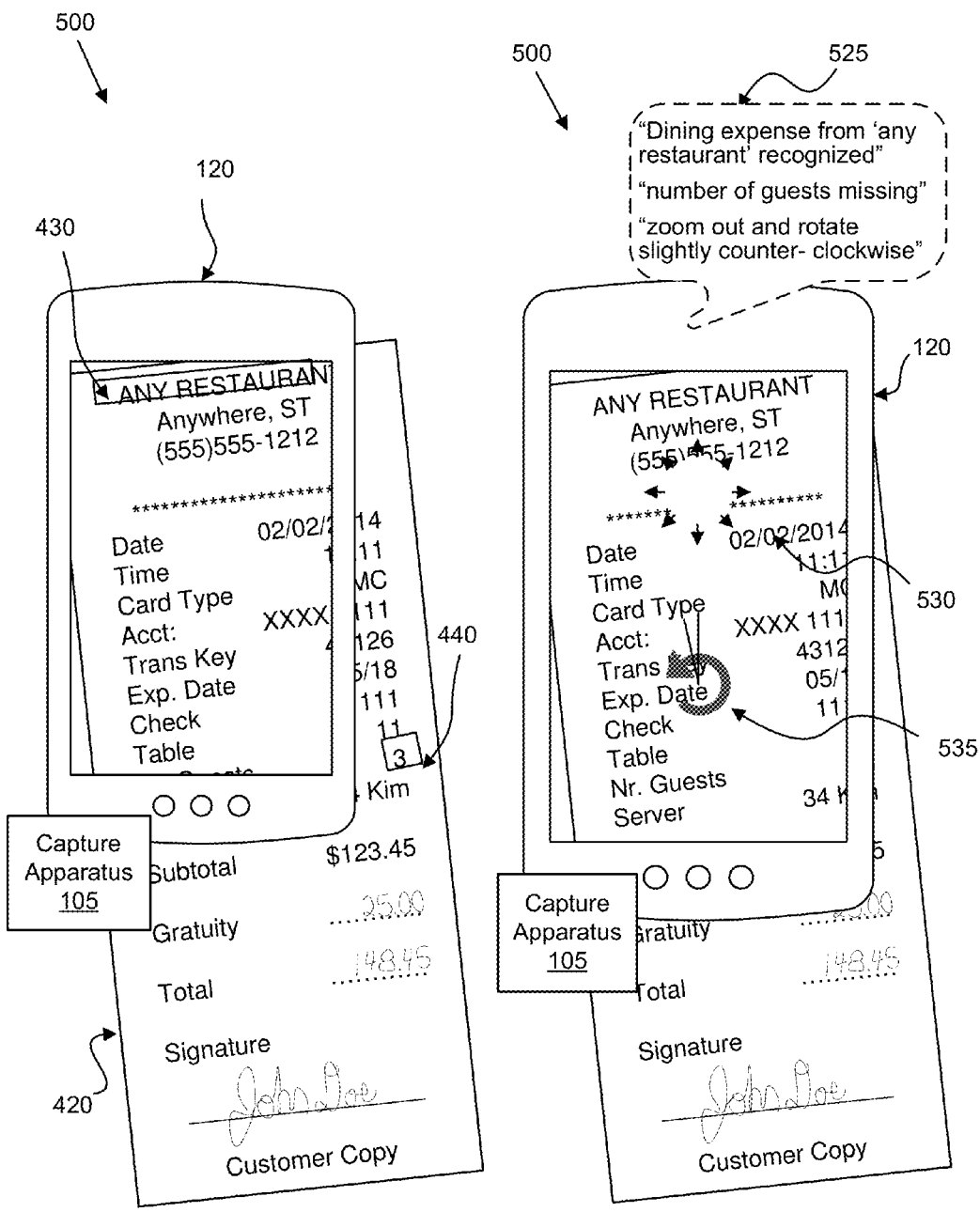
FIG. 5A depicts examples of capturing an image with missing expected data objects.
FIG. 5B depicts a capture apparatus providing guidance to facilitate capturing an image that includes the missing expected data objects.

FIG. 5A depicts an embodiment 500 of an image capture device and a capture apparatus 105 that identifies missing expected data for a determined context. An image capture device, represented as a smartphone 120 is depicted with an image of a receipt 420 shown in a viewer/display of the smartphone 120. Based on the fact that the recognition module 205 has recognized a restaurant name as a restaurant name expected data object 430 for a receipt context, the data module 215 identifies a number of guests as a number of guests expected data object 440, 445 for the context that is not currently recognizable within the image as depicted on the viewer. In other words, the data module 215 looked for the number of guests as an expected data location based on the context of a receipt for "Any Restaurant." Because an expected location for the number of guests is included in the context determined by the context module 210, the data module 215 identifies number of guests as a missing (number of guests expected data object 440, 445).

FIG. 5B depicts an embodiment 500 of the capture apparatus 105 associated with an image capture device, such as a smartphone 120. The capture apparatus 105 includes a guidance module 220 that, in response to identified missing expected data objects, provides guidance for capturing the second image expected to include the identified missing expected data objects. The guidance module 220 may provide guidance in various forms. For example, in some embodiments, the guidance module 220 provides a message 525 as guidance. In some embodiments, the message 525 is a verbal message, a video message, an audio message, or any type of message operable to provide guidance.

The guidance may confirm which data objects have been recognized and what context has been determined based on the recognized data objects. For example, the statement "Dining expense from Any Restaurant recognized" confirms that the context is a receipt context associated with a restaurant named Any Restaurant. A statement "number of guests missing" may provide guidance that an expected data object number of guest is not found within the image data stored and recognized thus far. The statement "zoom out and rotate slightly counterclockwise" as depicted in message 525 represents guidance that may be verbal or textual.

Symbolic guidance may be provided by the guidance module 220. For example, a first symbol 530 may provide guidance for the user as a symbol overlay on an image in a viewer. A second symbol 535 provides a different type of guidance indicating that the user should rotate the camera of the smartphone 125 counter-clockwise so that the image of the receipt 420 rotates clockwise by an indicated degree. Any combination of guidance in any expected form or format may be provided by the guidance module 220. Guidance does not necessarily have to be displayed for observation and response by a user. Guidance may also include a signal or data sent electronically to provide guidance to a module (e.g. 205, 210, 215, 220, 305) within the capture apparatus 105, or to the image capture device (e.g. 115, 120, 125, 130, 135) itself.

Figure 5C:
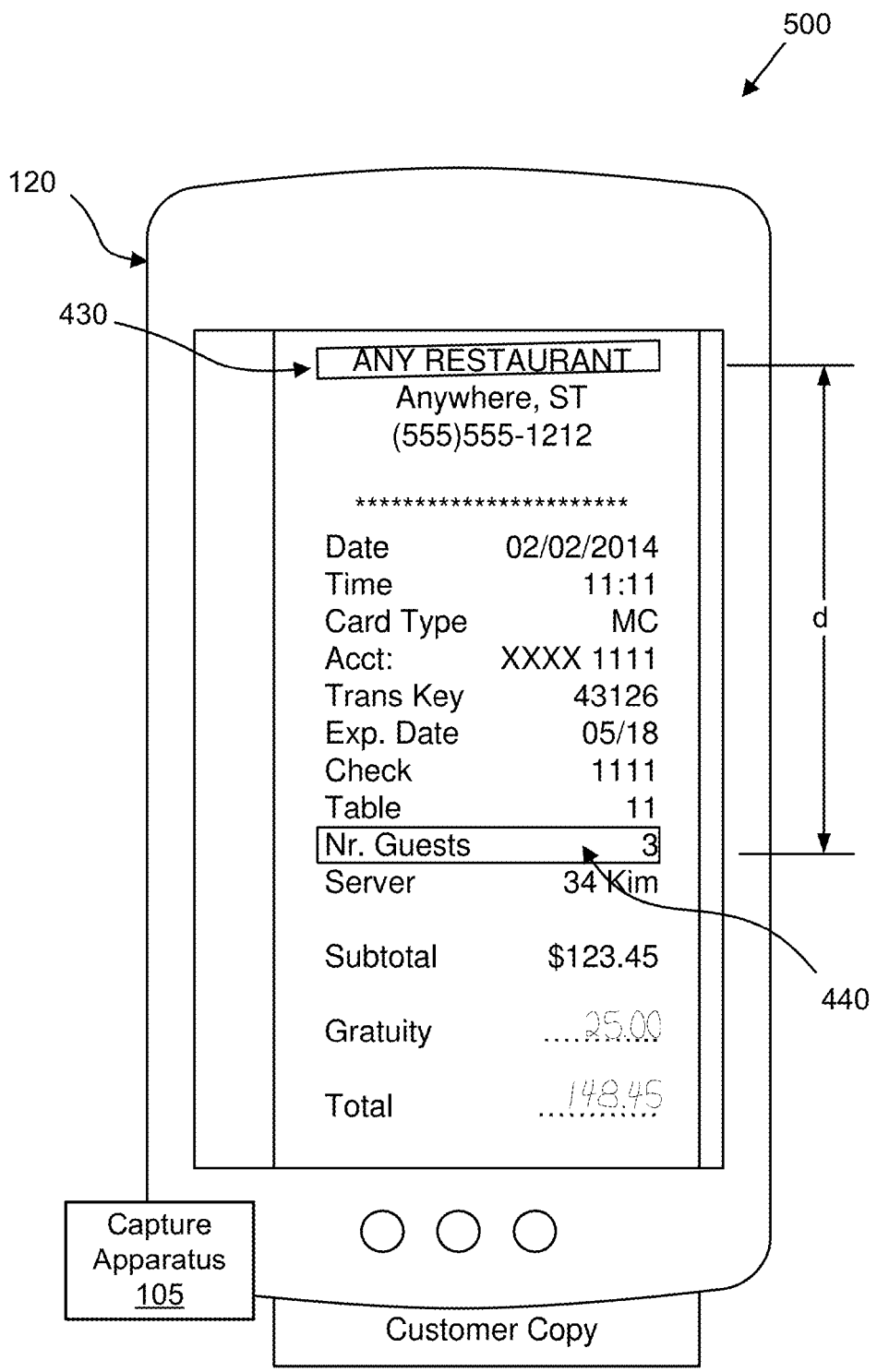
FIG. 5C depicts an image capture device capturing an image that includes the expected data objects based on guidance provided by a capture apparatus.

FIG. 5C depicts an embodiment 500 of the capture apparatus 105, associated with an image capture device, that provides guidance to facilitate capturing an image that includes the expected data objects for a determined context. As a user follows guidance provided by the guidance module 220 of the capture apparatus 105, a second image may be captured that is expected to include the expected data objects. For example, in this case the number of guests (the number of guests expected data object 440) has been identified by the data module 215 as a missing expected data object. The guidance module 220 includes data about expected data location for number of guests 430 a distance 'd' below the location of the name of the restaurant named "Any Restaurant," (the restaurant name expected data object 430).

The guidance module 220 provides guidance such as the message 525, or the first symbol 530, and/or the second symbol 535 to facilitate capture of a second data image expected to include the missing expected data objects, which in this case is number of guests (the number of guests expected data object 440). The guidance module 220 may provide guidance via the viewer of the image capture device.

The guidance module 220 may also provide guidance via a speaker, or a text display, or via a wired or wireless connection to a communication device such as a Bluetooth connection to an earphone. Guidance need not be limited to guidance to a user. Guidance may include electronic guidance provided to or from another image capture device or any device capable of connecting to the capture apparatus 105, through a channel such as the data network 110.

Thus, the capture apparatus 105 with its recognition, context, data, guidance, and/or storage modules (205, 210, 215, 220, and/or 305), facilitates capture of expected data for the receipt context associated with the image. It should be understood that the examples illustrated in FIG. 4A, 4B, 4C, 4D, 5A, 5B, 5C, are merely simple examples for illustration purposes. More complex contexts and types of data objects, as well as more complex recognition and context determination algorithms, are included in some embodiments.

Figure 6:
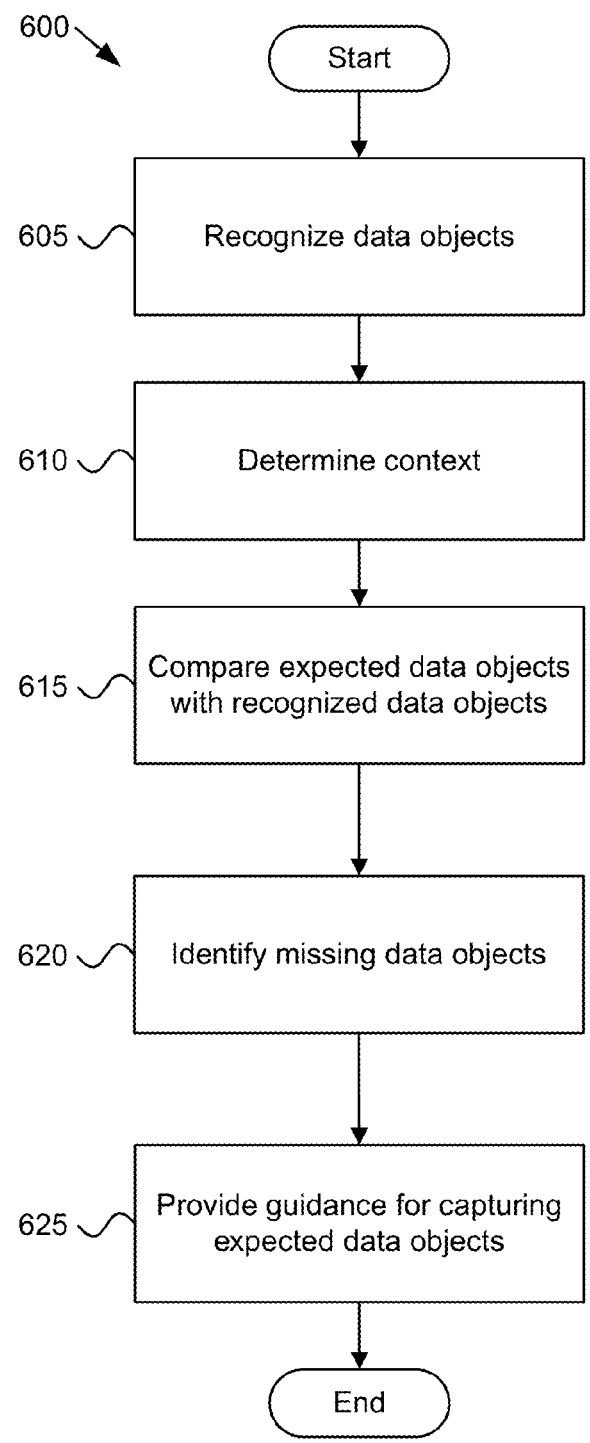
FIG. 6 is a schematic flowchart diagram illustrating an embodiment of a method for capturing an image.

FIG. 6 illustrates an embodiment of a method 600 for recognizing the objects to determine a context for image capture and identifying missing expected data objects to provide guidance for capturing the missing expected data objects. The method 600 starts and the method 600 recognizes data objects in data available to an image capture device. At least a portion of the data available includes characters. In one embodiment, recognizing data objects is carried out by the recognition module 205 as described above with regard to the detailed description and illustrations of FIGS. 2, 3, 4A, 4B, 4C, 4D, 5A, 5B, and 5C.

The method 600 recognizes 605 data objects. A portion of the recognized data objects are recognized from within the image data. In some embodiments, recognizing 605 data objects also includes recognizing data objects from non-image data such as textual data voice data user data or data received over network such as data network 110.

The method 600 determines 610 a context associated with a first image available from the image capture device. The context includes one or more expected data objects. The first image includes at least a portion of the recognized data objects. In some embodiments, the context is one of a number of available contexts such as an expense report context, a receipt context for a particular restaurant, a parking monitoring context, a real estate listing context, or any context for a particular type of image. Each context includes one or more expected data objects such as text or numbers to be recognized, other non-character objects to be recognized within image data such as an image of a porch light, a license plate logo, a receipt logo, or any expected data object associated with the context. In some embodiments, determining 610 the context may be carried out completely within the image capture device associated with the capture apparatus 105 or it may involve communication via the data network 110 to a server 140 or between a first image capture device, such as a smartphone 120 and a second image capture device such as a second smartphone 125.

The method 600 compares 615 the expected data objects for the determined context, with the recognized data objects from the first image and identifies 620 missing expected data objects not found in the first image. For example, a particular value (the number of guests expected data object 440 for the first receipt 420 and the number of guests expected data object 445 for the second receipt 425) associated with a label such as "number of guests" label (data object 435) on a receipt as depicted in the example of FIG. 5A. In one embodiment, the data module 215 compares 615 the expected data objects and the recognized data objects and identifies 620 missing expected data objects. In some embodiments this includes data values or other information important to a particular application.

In response to identified missing data, the method 600 provides 625 guidance for capturing a second image expected to include the missing data objects, and the method 600 ends. The guidance may be visual, audio, and/or textual. In one embodiment, the guidance module 220 provides 625 visual, audio, and/or textual guidance for panning, zooming, rotating the image capture device for capturing a second image expected to include the missing expected data objects, as described with respect to FIG. 5B.

Figure 7:
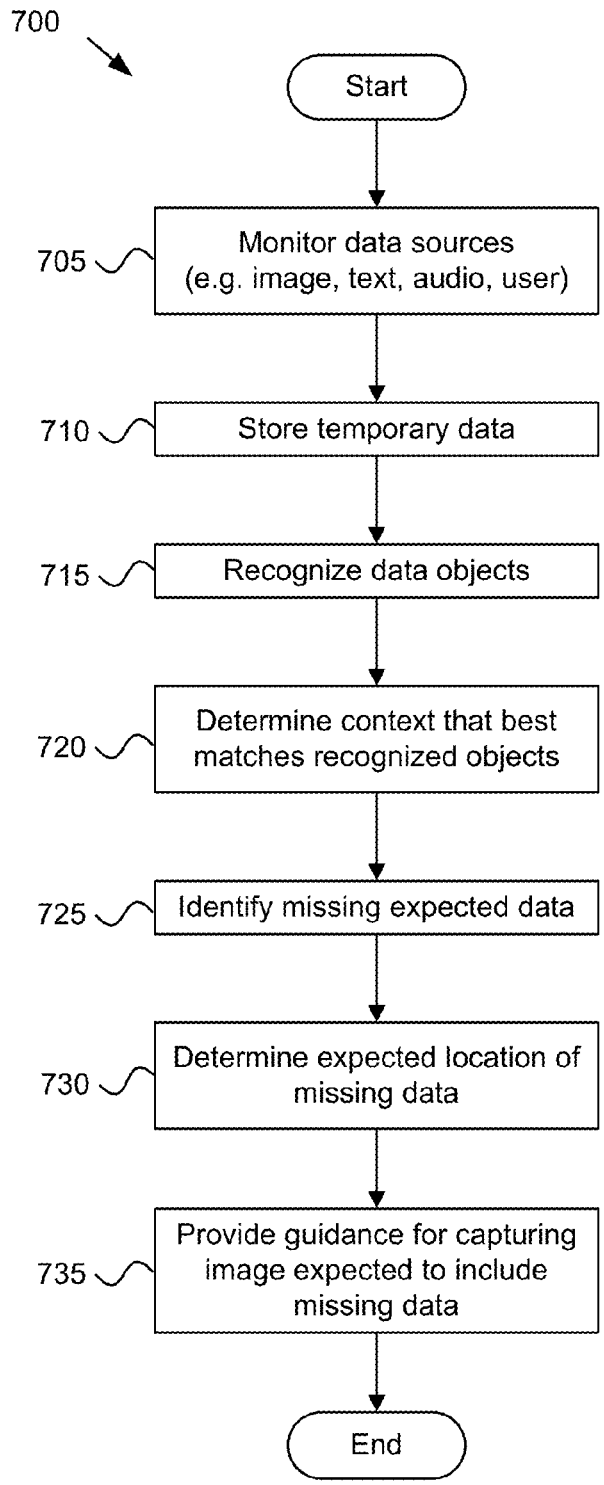
FIG. 7 is a schematic flowchart diagram illustrating another embodiment of a method for capturing an image.

It will be noted that the types of data available, the sources of data, the contexts, the relative locations of recognized data objects to each other, the relative locations of expected data objects, the determining of a context from a number of contexts, the taking into account of image capture parameters as data is temporarily stored described above with respect to the description of modules 205, 210, 215, 220, 305 and with respect to the examples illustrated in FIGS. 4A, 4B, 4C, 4D, 5A, 5B, and 5C are similarly applicable to the method 600 of FIG. 6, the method 700 of FIG. 7, the system 100 of FIG. 1, and the apparatuses 200, 300 of FIGS. 2 and 3, as described below.

FIG. 7 illustrates another embodiment of a method 700 for capturing missing expected data objects within a digital image. The method 700 starts and monitors 705 various data sources associated with an image capture device such as a smartphone 120, 125. Data sources for various embodiments include image data sources, textual data sources, audio data sources, and user data sources. The data sources may be captured directly by the image capture device. The data sources may also be received or transferred to the image capture device and the associated capture apparatus 105 through the data network 110 from any number of other image capture devices or from the server 140.

The method 700 stores 710 data from various data sources (e.g. image data sources, textual data sources, audio data sources, and the like) temporarily. In one embodiment, the storage module 305 temporarily stores 710 data. In some embodiments, the method 700 stores 710 the relative location of recognized data objects to each other taking into account changes in image capture parameters occurring as the data is temporarily stored. Changes in image capture parameters within a viewer that occur as image data is monitored and stored may include panning, zooming, lighting, focus, and so forth, effected either by adjusting controls of the image capture device, by movement of the image capture device, and/or in some cases by a slight movement of the subject of the image capture.

For example, if a user pans to the right during monitoring and storing of image data, a location of a first data object from the image data before the panning occurred may correctly take into account the amount of panning that occurred so as to correctly identify the relative location of a second data object within the image after the panning occurred. Similar adjustments can be made for zooming, focusing, lighting and so forth, so as to correctly derive the relative locations of recognized data objects captured at various points in which data is stored temporarily.

The method 700 recognizes 715 data objects. The recognition module 205 may recognize 715 the data objects. Some of the recognized data objects are recognized from within the image data. In some embodiments, recognizing 715 data objects also includes recognizing data objects from non-image data such as textual data voice data user data or data received over network such as data network 110. The method 700 determines 720 the context that best matches the recognized data objects recognized by recognition module 205.

For example, the method 700 may determine 720 that the context is a receipt context for a particular restaurant related to an expense report application for user of a smartphone 120 as described above. The context module 210 may determine 720 the context. Although a very simple algorithm for finding the context that best matches the recognized objects includes simply determining that the context is that context which has the greatest number of expected objects found within the recognized data other more sophisticated algorithms could be used, for example in cases where the number of recognized expected objects is insufficient to determine the correct context.

The method 700 identifies 725 any expected data objects for the context that is not found within the current data or temporarily stored data. Data objects not found are identified as missing expected data objects. For example, the data module 215 may identify 725 the missing expected data objects. The method 700 determines 730 an expected location for the missing expected data objects from the context. In some embodiments, the data module 215 may determine 730 an expected location of the missing expected data objects. The expected data locations may be determined from the relative locations between data objects in previously captured and recognized images for a given context. Expected locations may also be determined from a location of a data object within temporarily stored data and a data object within another part of the temporarily stored data where the relative location of the two data objects in the temporarily stored data takes into account any adjustments of image capture parameters made during the storing of the image data.

The method 700 provides 735 guidance to the user for capturing an image expected to include the missing expected data objects, and the method 700 ends. For example, in cases in which the name of a restaurant is missing and the name of the restaurant is usually found at the top of a receipt for a receipt context the guidance module 220 may provide 735 guidance that instructs a user to pan up and possibly zoom out so that the name of the restaurant can be found within a second image captured by the image capture device. It should be noted that other steps may be included in embodiments of the methods 600, 700 of FIGS. 6 and 7. The various steps of the methods 600, 700 of FIGS. 6 and 7 do not necessarily need to be performed in the order illustrated.

Referring again to FIGS. 1-3, in one embodiment, the system 100 includes an image capture device that includes a processor. The system 100, in the embodiment, also includes a computer readable storage device in the image capture device, e.g. 115, 120, 125, 130, 135. The image capture device includes a recognition module 205 that recognizes data objects in data available to the image capture device. At least a portion of the data comprises characters. In the embodiment, the system 100 further includes a context module 210 that determines a context associated with a first image available from the image capture device. The context has one or more expected data objects. The first image includes at least a portion of the recognized data objects.

In the embodiment, the system 100 further includes a data module 215 that compares the expected data objects for the determined context, with the recognized data objects from the first image to identify missing expected data objects not found in the first image. In the embodiment, the system 100 further includes a guidance module 220 that provides, in response to identified missing data, guidance for capturing a second image expected to include the missing expected data objects.

In some embodiments, the processor is part of the image capture device. In other embodiments, the processor is in data communication with the image capture device, such as by the data network 110, or by some other data communications channel. In one embodiment, the processor performs at least of portion of the functions of the recognition module 205, the context module 210, the data module 215, and/or the guidance module 220. For example, in some embodiments, the system 100 includes a portable computing device 130 such as a tablet, that includes a processor and a camera, or the system 100 may include a smartphone 120, 125 that include a processor and a camera.

In some embodiments, at least a portion of functions of the recognition module 205, the context module 210, the data module 215, and/or the guidance module 220 are carried out by a processor that is part of the image capture device. In other embodiments a processor that is part of the image capture device carries out a portion of functions of the modules 205, 210, 215, 220, while another processor on another processing device (such as a second image capture device that includes a processor or a server that includes a processor) carries out a portion of one or more of the modules 205, 210, 215, 220. In some embodiments, the system 100 carries out some or all the steps of the method 600 of FIG. 6 and/or the method 700 of FIG. 7 in any order that would be operable to provide appropriate guidance for capturing a digital image that includes any missing expected data for a determined context.

Thus, various embodiments of the capture apparatus 105, and the methods 600, 700 of FIGS. 6 and 7 provide guidance to user for capturing expected data for a given context associated with an image capture device and/or an application associated with an image capture device. Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a recognition module that recognizes data objects in data available to an image capture device, wherein at least a portion of the data comprises characters;
    a context module that determines a context associated with a first image available from the image capture device, the context having one or more expected data objects, wherein the first image comprises at least a portion of the recognized data objects;
    a data module that compares the expected data objects for the determined context, with the recognized data objects from the first image to identify missing expected data objects not found in the first image; and
    a guidance module that, in response to identified missing data, provides guidance via one or more of an audio, graphical, or electronic interface of the image capture device for capturing a second image expected to include the missing expected data objects,
    wherein said modules comprise one or more of a hardware circuit, a programmable hardware device and a processor executing code.

2. The apparatus of claim 1, wherein the determined context is one of a plurality of contexts, each of the plurality of contexts comprising one or more expected data objects.

3. The apparatus of claim 2, wherein the determined context comprises a context of the plurality of contexts with a greatest number of expected data objects corresponding to the recognized data objects.

4. The apparatus of claim 2, wherein one or more of the plurality of contexts comprise one or more of:
  data previously captured by the image capture device, wherein the image capture device is used by a user;
  data previously captured by another image capture device linked to the user of the image capture device; and
  contexts associated with one or more of accounts and vendors associated with the user.

5. The apparatus of claim 1, further comprising a storage module that temporarily stores the data available to the image capture device ("temporarily stored data") for processing by the recognition module.

6. The apparatus of claim 5, wherein the first image comprises a portion of the temporarily stored data.

7. The apparatus of claim 6, wherein the data module further determines an expected location of missing expected data objects based on one or more of:
  relative locations of recognized data objects within the temporarily stored data; and
  relative locations of expected data objects to each other for the determined context.

8. The apparatus of claim 7, wherein the relative location of recognized data objects to each other is determined taking into account changes in image capture parameters occurring as the data is temporarily stored.

9. The apparatus of claim 5, wherein the temporarily stored data comprises relative locations of each of the data objects within the temporarily stored data, the relative locations of the data objects with respect to each other.

10. The apparatus of claim 1, wherein the guidance module provides guidance comprising one or more of panning, zooming, lighting, and focusing, the guidance calculated to facilitate capturing the second image, based on an expected location of the missing expected data objects.

11. The apparatus of claim 1, wherein the first image comprises an image available in a viewer of the image capture device.

12. The apparatus of claim 11, wherein the guidance module provides the guidance via the viewer of the image capture device.

13. The apparatus of claim 1, wherein the recognition module recognizes data objects in the data available to the image capture device using optical character recognition.

14. The apparatus of claim 1, wherein the data available to the image capture device comprises one or more of image data, speech data, textual data, geographical data, and user data.

15. A method comprising:
  recognizing data objects in data available to an image capture device, wherein at least a portion of the data comprises characters;
  determining a context associated with a first image available from the image capture device, the context having one or more expected data objects, wherein the first image comprises at least a portion of the recognized data objects;
  comparing the expected data objects for the determined context, with the recognized data objects from the first image to identify missing expected data objects not found in the first image; and
  providing, in response to identified missing data, guidance via one or more of an audio, graphical, or electronic interface of the image capture device for capturing a second image expected to include the missing expected data objects.

16. The method of claim 15, wherein the determined context is one of a plurality of contexts, each of the plurality of contexts comprising one or more expected data objects, wherein one or more of the plurality of contexts comprise one or more of:
  data previously captured by the image capture device, wherein the image capture device is used by a user;
  data previously captured by another image capture device linked to the user of the image capture device; and
  contexts associated with one or more of accounts and vendors associated with the user.

17. The method of claim 16, wherein the determined context comprises a context of the plurality of contexts with a greatest number of expected data objects corresponding to the recognized data objects.

18. The method of claim 15, further comprising determining an expected location of the missing expected data objects by one or more of:
  temporarily storing the data available to the image capture device ("temporarily stored data"), wherein relative locations of the recognized data objects within the temporarily stored data are used to determine the expected location of the missing expected data objects, and wherein the first image comprises a portion of the temporarily stored data; and
  determining relative locations of expected data objects to each other from the determined context.

19. The method of claim 18, wherein determining an expected location of the missing expected data objects takes into account changes in image capture parameters occurring as the data is temporarily stored.

20. A system comprising:
  an image capture device comprising a processor; and
  a computer readable storage device in the image capture device comprising:
    a recognition module that recognizes data objects in data available to the image capture device, wherein at least a portion of the data comprises characters;
    a context module that determines a context associated with a first image available from the image capture device, the context having one or more expected data objects, wherein the first image comprises at least a portion of the recognized data objects;
    a data module that compares the expected data objects for the determined context, with the recognized data objects from the first image to identify missing expected data objects not found in the first image; and
    a guidance module that provides, in response to identified missing data, guidance via one or more of an audio, graphical, or electronic interface of the image capture device for capturing a second image expected to include the missing expected data objects.

* * * * *